US012234526B2

(12) United States Patent
Hong

(10) Patent No.: US 12,234,526 B2
(45) Date of Patent: Feb. 25, 2025

(54) STEEL PLATE FOR PRESSURE VESSEL WITH EXCELLENT CRYOGENIC TOUGHNESS AND EXCELLENT DUCTILITY AND MANUFACTURING METHOD THEREOF

(71) Applicant: POSCO, Pohang-si (KR)

(72) Inventor: Soon-Taik Hong, Pohang-si (KR)

(73) Assignee: POSCO HOLDINGS INC., Seoul (KR)

( * ) Notice: Subject to any disclaimer, the term of this patent is extended or adjusted under 35 U.S.C. 154(b) by 775 days.

(21) Appl. No.: 17/286,409

(22) PCT Filed: Oct. 8, 2019

(86) PCT No.: PCT/KR2019/013214
§ 371 (c)(1),
(2) Date: Apr. 16, 2021

(87) PCT Pub. No.: WO2020/085684
PCT Pub. Date: Apr. 30, 2020

(65) Prior Publication Data

US 2021/0388457 A1 Dec. 16, 2021

(30) Foreign Application Priority Data

Oct. 26, 2018 (KR) ........................ 10-2018-0128760

(51) Int. Cl.

| | |
|---|---|
| ***C21D 9/46*** | (2006.01) |
| ***C21D 1/18*** | (2006.01) |
| ***C21D 6/00*** | (2006.01) |
| ***C21D 8/02*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***F17C 1/00*** | (2006.01) |

(52) U.S. Cl.
CPC ................. *C21D 9/46* (2013.01); *C21D 1/18* (2013.01); *C21D 6/001* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 38/002* (2013.01); *C22C 38/02* (2013.01); *C22C 38/04* (2013.01); *C22C 38/06* (2013.01); *C22C 38/08* (2013.01); *C21D 2211/002* (2013.01); *C21D 2211/008* (2013.01); *F17C 2203/0639* (2013.01); *F17C 2209/2181* (2013.01)

(58) Field of Classification Search
CPC ............ C21D 1/18; C21D 1/185; C21D 1/25; C21D 1/26; C21D 2211/002; C21D 2211/008; C21D 6/00; C21D 6/001; C21D 6/005; C21D 6/008; C21D 8/02; C21D 8/0205; C21D 8/0226; C21D 8/0263; C21D 9/46; C22C 38/00; C22C 38/002; C22C 38/02; C22C 38/04; C22C 38/06; C22C 38/08; F17C 2203/0639; F17C 2209/2181
See application file for complete search history.

(56) References Cited

U.S. PATENT DOCUMENTS

| | | | | |
|---|---|---|---|---|
| 2004/0096351 | A1* | 5/2004 | Suzuki .................. | C21D 8/005 420/60 |
| 2007/0107808 | A1 | 5/2007 | Bauk et al. | |
| 2008/0283158 | A1* | 11/2008 | Nagao ...................... | C21D 8/02 148/547 |
| 2012/0031532 | A1 | 2/2012 | Ishikawa et al. | |
| 2014/0116578 | A1 | 5/2014 | Zhang et al. | |
| 2015/0064052 | A1* | 3/2015 | Tokita ..................... | C22C 38/24 72/46 |
| 2015/0147222 | A1 | 5/2015 | Miura et al. | |
| 2018/0371567 | A1 | 12/2018 | Hong | |
| 2018/0371568 | A1 | 12/2018 | Hong | |
| 2019/0100818 | A1 | 4/2019 | Kim et al. | |
| 2020/0071798 | A1 | 3/2020 | Hong | |

FOREIGN PATENT DOCUMENTS

| | | | | |
|---|---|---|---|---|
| CN | 1764734 | A | | 4/2006 |
| CN | 1902330 | A | | 1/2007 |
| CN | 102119236 | A | | 7/2011 |
| CN | 103014539 | A | | 4/2013 |
| CN | 104831165 | A | | 8/2015 |
| CN | 105624555 | A | * | 6/2016 |
| JP | S61-221327 | A | | 10/1986 |
| JP | H11-293380 | A | | 10/1999 |
| JP | 2001-288512 | A | | 10/2001 |
| JP | 2002-030380 | A | | 1/2002 |

(Continued)

OTHER PUBLICATIONS

Indium Applications Across Industries: A Comprehensive Overview Stanford Advanced Materials (Year: 2022).*
International Search Report dated Jan. 16, 2020 issued in International Patent Application No. PCT/KR2019/013214 (with English translation).
Extended European Search Report dated Nov. 9, 2021 issued in European Patent Application No. 19875257.8.
Chinese Office Action dated Dec. 1, 2021 issued in Chinese Patent Application No. 201980069723.8 (with English translation).

*Primary Examiner* — Jenny R Wu
(74) *Attorney, Agent, or Firm* — Morgan, Lewis & Bockius LLP

(57) ABSTRACT

Provided are a steel plate for a pressure vessel with excellent cryogenic toughness and excellent ductility, and a manufacturing method thereof. The steel plate for a pressure vessel of the present invention comprises, in weight %, 0.05 to 0.15% of C; 0.20 to 0.40% of Si; 0.3 to 0.6% of Mn; 0.001 to 0.05% of Al; 0.012% or less of P; 0.015% or less of S; 4.0 to 5.0% of Ni; 0.001 to 0.10% of In; and the balance being Fe and unavoidable impurities, wherein a steel microstructure consists of 15 to 80 area % of tempered bainite and the balance being tempered martensite.

2 Claims, No Drawings

(56) References Cited

FOREIGN PATENT DOCUMENTS

| | | | |
|---|---|---|---|
| JP | 2003-119543 | A | 4/2003 |
| JP | 2004-285456 | A | 10/2004 |
| JP | 2015-086403 | A | 5/2015 |
| JP | 2016-176141 | A | 10/2016 |
| JP | 2016-183387 | A | 10/2016 |
| KR | H07-109544 | A | 4/1995 |
| KR | 10-2012-0011289 | A | 2/2012 |
| KR | 10-2012-0067149 | A | 6/2012 |
| KR | 10-2012-0067150 | A | 6/2012 |
| KR | 10-2016-0063532 | A | 6/2016 |
| KR | 10-2016-0078669 | A | 7/2016 |
| KR | 10-1702480 | B1 | 2/2017 |
| KR | 10-2017-0073015 | A | 6/2017 |
| KR | 10-2017-0075050 | A | 7/2017 |
| KR | 10-2018-0071683 | A | 6/2018 |
| WO | 2005/035800 | A1 | 4/2005 |

* cited by examiner

STEEL PLATE FOR PRESSURE VESSEL WITH EXCELLENT CRYOGENIC TOUGHNESS AND EXCELLENT DUCTILITY AND MANUFACTURING METHOD THEREOF

CROSS-REFERENCE OF RELATED APPLICATIONS

This application is the U.S. National Phase under 35 U.S.C. § 371 of International Patent Application No. PCT/KR2019/013214, filed on Oct. 8, 2019, which in turn claims the benefit of Korean Application No. 10-2018-0128760, filed on Oct. 26, 2018, the entire disclosures of which applications are incorporated by reference herein.

TECHNICAL FIELD

The present disclosure relates to a steel plate used for low temperature pressure vessels, ships, storage tanks, structural steel, or the like, and a method of manufacturing the same, and more particularly, to a steel plate for a 700 MPa class low temperature pressure vessel, having excellent cryogenic toughness and ductility, and a method of manufacturing the same.

BACKGROUND ART

A high-strength thick plate steel for low temperatures is comprised of a mixture structure of tempered martensite structure, retained austenite and tempered bainite structure, and since such a steel material should be able to be used as a cryogenic structural material during construction, cryogenic toughness and ductility are required.

On the other hand, as such, the high-strength structural steel for cryogenic use is required for excellent cryogenic toughness and ductility, and high strength hot-rolled steel manufactured through the related art normalizing treatment has a mixed structure of ferrite and pearlite. As an example thereof, the invention described in Patent Document 1 may be provided.

The patent document 1 discloses that the high-strength steel for 500 MPa-class LPG is comprised of, in % by weight, C: 0.08 to 0.15%, Si: 0.2 to 0.3%, Mn: 0.5 to 1.2%, P: 0.01 to 0.02%, S: 0.004 to 0.006%, Ti: more than 0% to 0.01% or less, Mo: 0.05 to 0.1%, Ni: 3.0 to 5.0%, a balance of Fe, and other unavoidable impurities, and it is characterized by the addition of Ni and Mo in the steel composition.

However, the invention described in the above publication has a problem that the cryogenic toughness and ductility of the steel material are insufficient even when Ni or the like is added, since the steel material is manufactured through general normalizing.

Therefore, in high-strength thick steel plates used for low temperature pressure vessels, ships, storage tanks, structural steels, and the like, there is a demand for the development of high-strength steel having excellent cryogenic toughness and ductility.

PRIOR TECHNICAL LITERATURE

Patent Literature (Patent Document 1) Korean Patent Publication No. 2012-0011289

DISCLOSURE

Technical Problem

Therefore, to prevent the problems of the related art, an aspect of the present disclosure is to provide a steel plate for a low-temperature pressure vessel, in which a structure of a steel manufactured by controlling a cooling and heat treatment process is provided as a mixed structure of tempered bainite and tempered martensite, and thus a tensile strength of 700 MPa class may be secured, a method of manufacturing the same.

However, the problem to be solved by the present disclosure is not limited to the problems mentioned above, and other problems that are not mentioned will be clearly understood by those skilled in the art from the following description.

Technical Solution

According to an aspect of the present disclosure, a steel plate for a low temperature pressure vessel having excellent cryogenic toughness and ductility comprises, in weight %, 0.05 to 0.15% of C, 0.20 to 0.40% of Si, 0.3 to 0.6% of Mn, 0.001 to 0.05% of Al, 0.012% or less of P, 0.015% or less of S, 4.0 to 5.0% of Ni, 0.001 to 0.10% of In, a balance of Fe, and unavoidable impurities. A steel microstructure of the steel plate is comprised of 15 to 80 area % of tempered bainite and a balance tempered martensite.

The In may be contained in a range of 0.05 to 0.08 weight %.

According to another aspect of the present disclosure, a method of manufacturing a steel plate for a low temperature pressure vessel having excellent cryogenic toughness and ductility, includes:

- reheating a steel slab at 1050 to 1250° C., the steel slab containing, in weight %, 0.05 to 0.15% of C, 0.20 to 0.40% of Si, 0.3 to 0.6% of Mn, 0.001 to 0.05% of Al, 0.012% or less of P, 0.015% or less of S, 4.0 to 5.0% of Ni, 0.001 to 0.10% of In, a balance of Fe, and unavoidable impurities;
- hot rolling the reheated steel slab at a reduction ratio of 5 to 30% per pass, and terminating rolling at a temperature of 800° C. or higher;
- primary cooling the hot-rolled steel plate at a cooling rate of 2.5 to 50° C./sec within 30 seconds after hot rolling;
- performing an intermediate heat treatment on the primary cooled steel plate for {2.4×t+(10-30)} minutes at a temperature of 690 to 760° C., where t is a thickness (mm) of a steel plate, and then, secondary cooling the steel plate at a cooling rate of 2.5 to 50° C./sec; and
- tempering the secondary cooled steel plate for {2.4×t+(10-30)} minutes at a temperature of 600 to 670° C., where t is a thickness (mm) of a steel plate.

A steel microstructure obtained by the tempering may be comprised of 15 to 80 area % of tempered bainite and a remainder of tempered martensite.

Advantageous Effects

According to an exemplary embodiment of the present disclosure having the configuration as described above, provided is a steel plate for a low-temperature pressure vessel having excellent toughness and ductility, which may be stably used at a low temperature of about −150° C. while satisfying the tensile strength of 700 MPa class.

BEST MODE FOR INVENTION

Hereinafter, exemplary embodiments of the present disclosure will be described in detail.

First, a steel plate for a low-temperature pressure vessel having excellent low-temperature toughness and ductility according to an exemplary embodiment of the present disclosure includes, in % by weight, C: 0.05 to 0.15%, Si: 0.20 to 0.40%, Mn: 0.3 to 0.6%, Al: 0.001 to 0.05%, P: 0.012% or less, S: 0.015% or less, Ni: 4.0 to 5.0%, In: 0.001 to 0.10%, balance Fe and unavoidable impurities. Detailed steel composition components and reasons for limiting the components are as follows, and in the following description of the steel composition components, % indicates weight %.

C: 0.05-0.15%

In an exemplary embodiment of the present disclosure, it may be preferable to limit the C content in the steel plate to the range of 0.05 to 0.15%. If the C content is less than 0.05%, the strength of the matrix itself is lowered, and if exceeding 0.15%, the weldability of the steel plate is greatly impaired.

Si: 0.20-0.40%

In the present disclosure, Si is a component added for the deoxidation effect, the solid solution strengthening effect, and the effect of increasing the impact transition temperature, and it may be preferable to add 0.20% or more to obtain such an addition effect. However, if it is added in excess of 0.40%, the weldability decreases and the oxide film is severely formed on the surface of the steel plate, and thus, it may be preferable to limit the content to 0.20 to 0.40%.

Mn: 0.3-0.6%

In the present disclosure, since Mn forms MnS, which is an elongated non-metallic inclusion, together with S, lowering the room temperature elongation and low temperature toughness, it may be preferable to manage the Mn content to 0.6% or less. However, if Mn is less than 0.3% due to the nature of the components in the present disclosure, it is difficult to secure an appropriate strength, and thus, it may be preferable that the amount of Mn may be limited to be 0.3 to 0.6%.

Al: 0.001-0.05%

In the present disclosure, Al, along with Si, is one of the strong deoxidizing agents in the steelmaking process, and the effect thereof is insignificant if the Al content is less than 0.001%, and if it is added in excess of 0.05%, manufacturing costs may increase, and thus, the content may be preferably limited to 0.001 to 0.05%.

P: 0.012% or Less

In the present disclosure, P is an element that impairs low-temperature toughness, but it requires excessive cost to remove P in the steelmaking process, and thus, it may be preferable to manage the P content to be 0.012% or less.

S: 0.015% or Less

In the present disclosure, S is also an element that adversely affects low-temperature toughness along with P, but since it may take an excessive cost to remove S in the steelmaking process similarly to P, the S content may be preferably managed to be 0.015% or less.

Ni: 4.0-5.0%

In the present disclosure, Ni is the most effective element for improving low-temperature toughness. However, if the amount thereof is less than 4.0%, the low-temperature toughness decreases, and if the amount exceeds 5.0%, manufacturing costs may increase. Therefore, it may be preferable to add Ni within the range of 4.0 to 5.0%.

In: 0.001-0.1%

In the present disclosure, In is a low melting point metal and is an important element that increases ductility. However, if the amount is less than 0.001%, the effect of the addition cannot be expected, and if it is added in excess of 0.1%, it may appear as coarse precipitates during the continuous casting process and may impair the low-temperature toughness. Therefore, it may be preferable to limit the In content to 0.001 to 0.1%.

More preferably, In may be added in the range of 0.05 to 0.08%.

On the other hand, the steel plate according to an exemplary embodiment of the present disclosure has a steel microstructure comprised of 25 to 80 area % of tempered bainite and the remainder of tempered martensite. If the tempered bainite fraction is less than 15%, the amount of tempered martensite is excessive, and the low-temperature toughness of the steel plate may be deteriorated. On the other hand, if it exceeds 80%, it may be difficult to secure the target strength of the steel plate.

The steel plate having the above-described steel composition component and microstructure may have excellent ductility and low temperature toughness, as well as effectively maintaining a tensile strength of 700 MPa class.

Next, a method of manufacturing a steel plate for a low temperature pressure vessel having excellent ductility and low temperature toughness according to an exemplary embodiment of the present disclosure will be described.

As a steel material for a pressure vessel according to an exemplary embodiment of the present disclosure, a steel slab that satisfies the alloy composition proposed in the present disclosure may be manufactured through the processes of [reheating-hot rolling and cooling-heat treatment and cooling-tempering]. Hereinafter, the respective process conditions will be described in detail.

Reheating of Steel Slab

First, in an exemplary embodiment of the present disclosure, it may be preferable to reheat a steel slab satisfying the above-described alloy composition to a temperature ranging from 1050 to 1250° C. In this case, if the reheating temperature is less than 1050° C., it is difficult to dissolve solute atoms, whereas if the reheating temperature exceeds 1250° C., the austenite grain size becomes too coarse, impairing the properties of the steel, which is not preferable.

Hot Rolling and Primary Cooling

Subsequently, in the present disclosure, the reheated steel slab is hot-rolled to manufacture a hot-rolled steel plate. In this case, the hot rolling may be preferably performed at a reduction ratio of 5 to 30% per pass.

If the reduction ratio per pass during the hot rolling is less than 5%, there is a problem in that manufacturing costs may increase due to a decrease in rolling productivity. On the other hand, if the reduction ratio per pass during the hot rolling exceeds 30%, it may cause a fatal adverse effect on the equipment by generating a load on the rolling mill, which is not preferable. It may be preferable to finish rolling at a temperature of 800° C. or higher. Rolling to a temperature of less than 800° C. causes a load on the rolling mill, which is not preferable.

A process of primary cooling (water cooling) is performed at a cooling rate of 2.5 to 50° C./sec within 30 seconds after hot rolling. If it exceeds 30 seconds before cooling after hot rolling, the temperature of the steel plate is excessively lowered, resulting in low hardenability, such that the required bainite+martensite structure may not be obtained. In addition, if the cooling rate is less than 2.5° C./sec, a ferrite structure may be obtained, and to obtain a cooling rate exceeding 50° C./sec, cooling equipment more than necessary is required, which are not preferable.

Heat Treatment and Secondary Cooling

The primary cooled hot-rolled steel plate may preferably be subjected to heat treatment at a predetermined temperature for a predetermined time. In detail, the heat treatment may be preferably maintained for {(2.4×t)+(10-30)} minutes (where t is the thickness (unit: mm) of the steel plate) at a temperature ranging from 690 to 760° C.

If the temperature during the heat treatment is less than 690° C., it is difficult to perform re-solid solution of solute elements in solid solution, and thus, it may be difficult to secure the target strength, whereas if the temperature exceeds 760° C., grain growth occurs, and thus, the low-temperature toughness may be deteriorated.

If the holding time during heat treatment in the above-described temperature range is less than {(2.4×t)+10} minutes, it is difficult to homogenize the structure, whereas if it exceeds {(2.4×t)+30} minutes, productivity is impaired, which is not preferable.

Then, in the present disclosure, it may be preferable to perform secondary cooling (water cooling) of the heat-treated hot-rolled steel plate to room temperature at a cooling rate of 2.5 to 50° C./s.

If the cooling rate is less than 2.5° C./s during the cooling, there is a concern that coarse ferrite grains may be generated, and if the cooling rate exceeds 50° C./s, it may not be preferable because the economy is impaired by excessive cooling equipment.

Tempering

Subsequently, in the present disclosure, the secondary cooled hot-rolled steel plate is tempered for {2.4×t+(10-30)} minutes [where t is the thickness (mm) of the steel material] at a temperature of 600 to 670° C. If the temperature is less than 600° C. during the tempering treatment, it may be difficult to secure the target strength due to the difficulty of precipitation of fine precipitates. On the other hand, if the temperature exceeds 670° C., the growth of the precipitate occurs and there is a concern that strength and low temperature toughness may be impaired.

If the retention time during the tempering treatment in the above-described temperature range is less than {(2.4×t)+10} minutes, it may be difficult to homogenize the structure, whereas if it exceeds {(2.4×t)+30} minutes, it is not preferable because productivity is impaired.

The steel microstructure obtained by the tempering process may be comprised of 15 to 80 area fractions (%) of tempered bainite and the balance tempered martensite.

MODE FOR INVENTION

Hereinafter, the present disclosure will be described in more detail through examples.

Example

After preparing the respective steel slabs having the composition components illustrated in Table 1, these steel slabs were respectively reheated at a temperature ranging from 1050 to 1250° C. In addition, each of these reheated steel plates was hot-rolled at a reduction ratio of 5 to 30% per pass, and at this time, the hot rolling end temperature was controlled as illustrated in Table 2. Then, each of the hot-rolled steel plates was primarily cooled under the conditions of Table 2 within 30 seconds after hot-rolling, and then, was subjected to heat treatment under the conditions of Table 2. Subsequently, the heat-treated hot-rolled steel plate was secondarily cooled to room temperature, and then, the secondary cooled steel plate was tempered under the conditions illustrated in Table 2.

As described above, the yield strength, tensile strength, and low-temperature toughness were evaluated for the manufactured steel plates, and the results are also illustrated in Table 2 below. On the other hand, in Table 2 below, the low-temperature toughness is a result of evaluating with the Charpy impact energy value obtained by performing a Charpy impact test on a specimen having a V notch at −150° C. In addition, tensile tests for measuring tensile strength and yield strength were conducted in accordance with ASTM A20, A370 and E8.

TABLE 1

| Steel | Composition Component (weight %) | | | | | | | |
|---|---|---|---|---|---|---|---|---|
| Grade | C | Mn | Si | Al | P | S | Ni | In |
| Inventive Steel a | 0.10 | 0.52 | 0.29 | 0.032 | 0.009 | 0.0012 | 4.49 | 0.08 |
| Inventive Steel b | 0.09 | 0.55 | 0.27 | 0.029 | 0.008 | 0.0010 | 4.45 | 0.05 |
| Inventive Steel c | 0.10 | 0.50 | 0.28 | 0.033 | 0.010 | 0.0011 | 4.85 | 0.07 |
| Comparative Steel d | 0.11 | 0.50 | 0.29 | 0.030 | 0.012 | 0.0012 | 4.20 | — |

TABLE 2

| Classification | Steel Grade | A* | B* | C* | D* | E* | F* | G* | YS (MPa) | TS (MPa) | EL (%) | H* |
|---|---|---|---|---|---|---|---|---|---|---|---|---|
| IE 1 | a | 850 | 15.0 | 730 | 50 | 630 | 1.5 | 65 | 658 | 718 | 38 | 256 |
| IE 2 | | 860 | 8.5 | 740 | 90 | 640 | 2.0 | 60 | 657 | 722 | 36 | 251 |
| IE 3 | b | 850 | 15.0 | 750 | 50 | 630 | 1.5 | 68 | 658 | 720 | 35 | 227 |
| IE 4 | | 860 | 8.5 | 730 | 90 | 640 | 2.0 | 57 | 657 | 715 | 37 | 233 |
| IE 5 | c | 850 | 15.0 | 720 | 50 | 630 | 1.5 | 68 | 660 | 725 | 38 | 230 |
| IE 6 | | 850 | 8.5 | 730 | 90 | 640 | 2.0 | 65 | 651 | 730 | 38 | 215 |
| CE 1 | a | 850 | Air cooling | — | — | 630 | 1.5 | 0 | 565 | 633 | 22 | 54 |
| CE 2 | | 860 | Air cooling | — | — | 640 | 2.0 | 0 | 562 | 621 | 21 | 35 |
| CE 3 | d | 860 | 10.0 | 720 | 50 | 630 | 1.5 | 35 | 540 | 655 | 24 | 85 |
| CE 4 | | 860 | 7.5 | 730 | 90 | 640 | 2.0 | 30 | 543 | 648 | 26 | 86 |
| CE 5 | | 850 | Air cooling | — | — | 630 | 1.5 | 0 | 528 | 623 | 25 | 55 |
| CE 6 | | 850 | Air cooling | — | — | 640 | 2.0 | 0 | 522 | 616 | 23 | 48 |

In Table 2, IE is Inventive Example, CE is Comparative Example, A* is the hot rolling end temperature (° C.), B* is the primary cooling (water cooling) rate (° C./s), C* is the heat treatment temperature (° C.), D* is the heat treatment time (min.), E* is the tempering temperature (° C.), F* is the tempering time (hr), G* is the tempered bainite fraction (%), and H* is the −150° C. impact toughness value (J).

As illustrated in Tables 1 and 2, in the case of Inventive Examples 1-6 in which the steel composition components and manufacturing process conditions satisfy the scope of the present disclosure, after tempering treatment, 15-80 area % of tempered bainite and the remainder tempered martensite structure may be obtained, and thus, it can be seen that the yield strength and tensile strength are excellent by about 100 MPa and 80 MPa, respectively, compared to Comparative Examples 1-6, and further, the elongation is excellent by 10% or more, and the −150° C. low-temperature toughness is also excellent by 100 J or more, compared to Comparative Examples 1-6.

Meanwhile, in Comparative Examples 1 and 2 in which the steel composition component range proposed in the present disclosure is satisfied, but the manufacturing process conditions are out of the scope of the present disclosure, and in Comparative Examples 2 to 4 in which steel manufacturing process conditions are within the scope of the present disclosure, but the steel composition component is outside the scope of the present disclosure; it can be seen that it is difficult to secure a required microstructure and secure required physical properties.

In addition, in Comparative Examples 5 and 6, in which not only the steel composition components but also the manufacturing process conditions are outside the scope of the present disclosure, it can be confirmed that it is difficult to secure a required microstructure and secure required physical properties.

As described above, in the detailed description of the present disclosure, exemplary embodiments of the present disclosure have been described, but various modifications may be made by those of ordinary skill in the art to which the present disclosure pertains without departing from the scope of the present disclosure. Therefore, the scope of the present disclosure is not limited to and should not be determined by the described embodiments, and should be determined by the claims to be described later, as well as those equivalent thereto.

The invention claimed is:

1. A steel plate for a pressure vessel, consisting of:

in weight %, 0.05 to 0.15% of C, 0.20 to 0.40% of Si, 0.3 to 0.6% of Mn, 0.001 to 0.05% of Al, 0.012% or less of P, 0.015% or less of S, 4.0 to 5.0% of Ni, 0.05 to 0.08% of In, a balance of Fe, and unavoidable impurities, wherein a steel microstructure is comprised of 15 to 80 area % of tempered bainite and a balance tempered martensite.

2. The steel plate for a pressure vessel of claim 1, wherein the In is contained in a range of 0.07 to 0.08%.

* * * * *